BEST AVAILABLE COPY

Oct. 3, 1967 AKIRA MATSUSHITA 3,345,622

MOUNTING DEVICE FOR MAGNETIC MEMORY DEVICES

Filed Dec. 31, 1964

INVENTOR.
Akira Matsushita
BY
H. Edward Mestern 3,345,622
Patented Oct. 3, 1967

3,345,622

MOUNTING DEVICE FOR MAGNETIC MEMORY DEVICES

Akira Matsushita, Tokyo-to, Japan, assignor to Toko Kabushiki Kaisha, Tokyo-to, Japan, a joint-stock company of Japan Filed Dec. 31, 1964, Ser. No. 422,826
Claims priority, application Japan, Jan. 10, 1964, 39/1,279, 39/1,280
3 Claims. (Cl. 340—174)

This invention relates to a novel mounting device for magnetic memory devices.

As is well known in the art, a magnetic memory device generally includes a plurality of conductors provided with magnetic films or coatings, which are fabricated in the form of a woven fabric, and the ends of the conductors are directly connected to terminals on a base by welding or soldering. However, such a mounting means creates magnetic or mechanical strains in the magnetic films which results in the deterioration of the operating characteristics of the memory device.

Accordingly, it is an object of this invention to provide a mounting device for such a magnetic memory device which can eliminate the above described difficulties.

Other objects and features of the present invention will be more readily understood from the following detailed description of specific embodiments thereof when read in conjunction with the accompanying drawings in which like parts are designated by like reference numerals, and in which.

Figure 1:
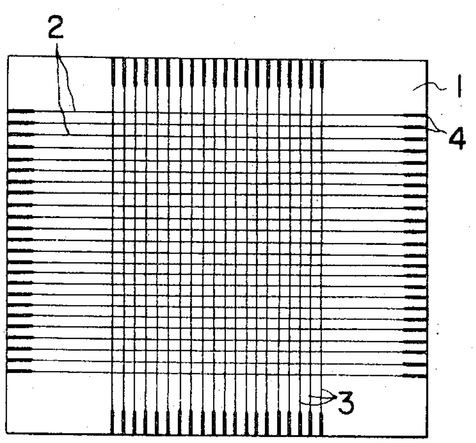
FIG. 1 is a planar view of a memory device utilizing conductors having magnetic films or coatings.

Referring now to the accompanying drawings, in FIG. 1, there is shown a planar view of a matrix type magnetic core memory device mounted upon a base 1. The memory device is generally formed as a woven fabric comprising transverse conductors 2 having magnetic films (not shown) and longitudinal conductors 3 or formed by sandwiching conductors 2 between printed films (not shown), and the opposite ends of the conductors 2 and 3 are connected to terminals 4 at the side edges of the base 1.

However, as the magnetic films deposited on the conductors 2 are very thin, their magnetic or BH characteristics are greatly affected by very slight mechanical strains whereby their memory characteristics are deteriorated or changed.

Thus, if the ends of the conductors 2 having magnetic films are directly connected to terminals by welding or soldering, magnetic strains will be caused in the magnetic films due to heating and cooling involved in the welding or soldering operation. Moreover, after mounting, as the opposite ends of the conductors 2 having magnetic films are fixed, there is a tendency for occurrence of mechanical strains or magnetic strains in these films due to elongation and contraction caused by external forces or temperature variations.

According to this invention, the ends of the conductors 2 with magnetic films are connected to the terminals 4 through relatively flexible conductive buffer wires 6. One end of these buffer wires 6 is connected to the end of the conductor 2 by soldering 7, for example, and the other end to the terminal 4 by welding or soldering. These buffer wires may be made of copper, silver or gold foil, or conductive films applied on plastic strips. A suitable bend or loop 5 may be included in the buffer wire to increase its flexibility.

Figures 2, 3, 4:
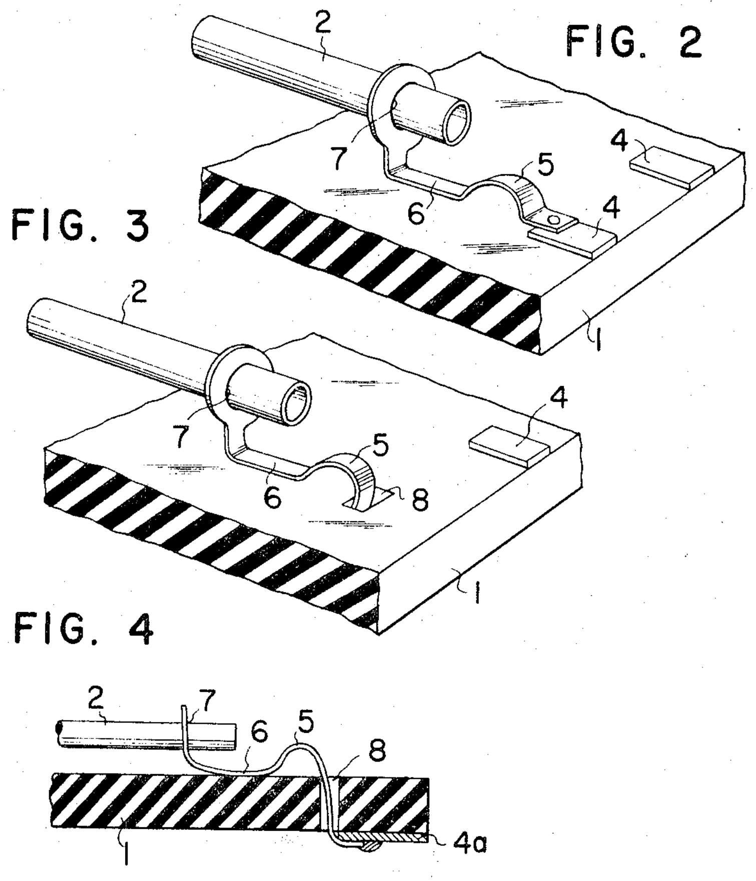
FIG. 2 is a perspective view of a mounting device embodying this invention.
FIG. 3 is a perspective view of a modified mounting device of this invention.
FIG. 4 is a vertical section of the mounting device shown in FIG. 3.

In the embodiment shown in FIG. 2, all of the buffer wires are connected to respective terminals 4 provided on one surface of the base 1 whereas in the modified form shown in FIGS. 3 and 4, alternate terminals 4a are provided on the opposite side of the base so that suitable apertures 8 are provided through the base to pass buffer wires. It is to be understood that these flexible buffer wires may be provided for one or both of the ends of the conductors 2.

With the mounting device according to this invention, any elongation, contraction or twisting of the conductors 2 having magnetic film is absorbed by the flexible buffer wire 6 so that the magnetic film is completely free from any mechanical or magnetic strain due to heat which is applied at the time of connection or temperature variation during use. Thus the invention provides magnetic memory devices having extremely stable characteristics.

While the invention has been described by illustrating particular embodiments thereof it should be understood that many modifications and alternations may be made therein without departing from the true spirit and scope of the invention as defined in the appended claims.

What I claim is:

1. In a matrix type magnetic memory device mounted upon a base and including elongated conductors covered with a magnetic film, and terminals provided at the side edges of said base, said conductors being connected to said terminals; the improvement which comprises a mounting device comprising a plurality of flexible buffer wires electrically connecting each of said conductors to corresponding terminals; the flexibility of said buffer wires providing absorption of elongation, contraction and twisting of said conductors.

2. The mounting device according to claim 1 wherein said flexible buffer wires include loops or bends to increase their flexibility.

3. The mounting device according to claim 1 wherein alternate buffer wires are connected to terminals on the opposite sides of said base.

References Cited

UNITED STATES PATENTS 3,008,130 11/1961 Devaud et al.

FOREIGN PATENTS 268,079 3/1927 Great Britain.

DARRELL L. CLAY, *Primary Examiner.*